United States Patent
Ookubo et al.

(10) Patent No.: US 11,422,269 B2
(45) Date of Patent: Aug. 23, 2022

(54) INFORMATION PROCESSING APPARATUS AND INFORMATION PROCESSING METHOD

(71) Applicant: SONY CORPORATION, Tokyo (JP)

(72) Inventors: Masashi Ookubo, Kanagawa (JP); Tomohisa Takaoka, Kanagawa (JP); Haruto Takeda, Tokyo (JP); Yu Tanaka, Tokyo (JP); Takahiro Tsujii, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 649 days.

(21) Appl. No.: 16/328,805

(22) PCT Filed: Jul. 7, 2017

(86) PCT No.: PCT/JP2017/025033
§ 371 (c)(1),
(2) Date: Feb. 27, 2019

(87) PCT Pub. No.: WO2018/066193
PCT Pub. Date: Apr. 12, 2018

(65) Prior Publication Data
US 2019/0243001 A1 Aug. 8, 2019

(30) Foreign Application Priority Data

Oct. 5, 2016 (JP) .............................. JP2016-196868

(51) Int. Cl.
*G01S 19/04* (2010.01)
*G01S 19/43* (2010.01)
(Continued)

(52) U.S. Cl.
CPC .............. *G01S 19/04* (2013.01); *G01S 19/36* (2013.01); *G01S 19/43* (2013.01); *G01S 19/45* (2013.01)

(58) Field of Classification Search
CPC .......... G01S 19/04; G01S 19/36; G01S 19/43; G01S 19/45
See application file for complete search history.

(56) References Cited

U.S. PATENT DOCUMENTS 7,310,062 B1    12/2007   Hwang

FOREIGN PATENT DOCUMENTS

JP       06-174820 A     6/1994
JP       2002-026631 A   1/2002
(Continued)

OTHER PUBLICATIONS

International Search Report and Written Opinion of PCT Application No. PCT/JP2017/025033, dated Oct. 3, 2017, 10 pages of ISRWO.

*Primary Examiner* — Dao L Phan
(74) *Attorney, Agent, or Firm* — Chip Law Group

(57) ABSTRACT

Provided is an information processing apparatus intended to address problems in which positioning devices simply equipped with a plurality of antennas will fail to perform the carrier positioning. The information processing apparatus includes a receiving unit and a processing unit. The receiving unit has a plurality of antennas located at second positions (Pa, Pb) and capable of receiving a carrier wave transmitted from a satellite. The processing unit performs positioning of a set first position (Po) on the basis of second phase information obtained by correcting first phase information of carrier waves respectively received by the plurality of the antennas.

18 Claims, 11 Drawing Sheets

(51) Int. Cl.
    *G01S 19/45*     (2010.01)
    *G01S 19/36*     (2010.01)

(56)     References Cited

FOREIGN PATENT DOCUMENTS

| | | |
|---|---|---|
| JP | 2003-167044 A | 6/2003 |
| JP | 2003-270320 A | 9/2003 |
| JP | 2005-017016 A | 1/2005 |
| JP | 2015-190935 A | 11/2015 |
| WO | 2016/121058 A1 | 8/2016 |

MULTIPLE SOLUTIONS

Ro

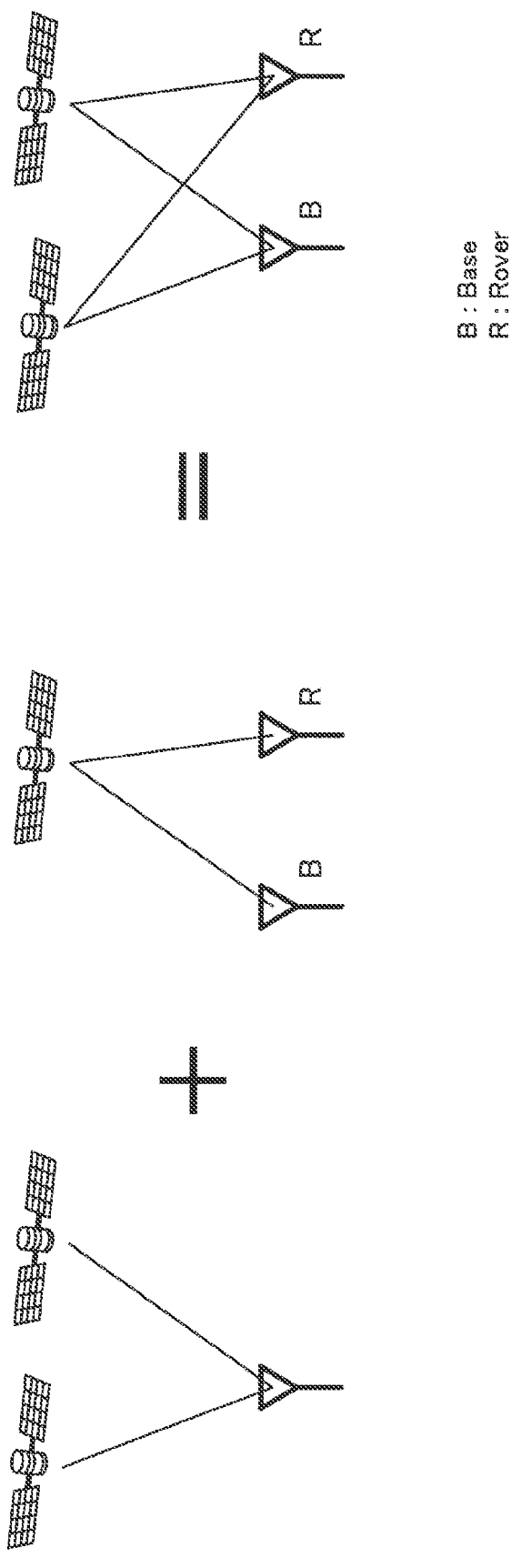

FIG. 9

→ ELEVATION ANGLE

↓ AZIMUTH ANGLE

| | 0° | 5° | ...... | 85° | 90° |
|---|---|---|---|---|---|
| 0° | | | | | |
| 5° | | | | | |
| ⋮ | | | | | |
| 350° | | | | | |
| 355° | | | | | |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/025033 filed on Jul. 7, 2017, which claims priority benefit of Japanese Patent Application No. JP 2016-196868 filed in the Japan Patent Office on Oct. 5, 2016. Each of the above-referenced applications is hereby incorporated herein by reference in its entirety.

TECHNICAL FIELD

The present disclosure relates to an information processing apparatus and an information processing method.

BACKGROUND ART

Technologies related to a device capable of performing positioning employing a positioning system such as global navigation satellite system (GNSS) using a carrier wave transmitted from a satellite are developed. An example of the technologies mentioned above includes the technique disclosed in Patent Literature 1 below.

CITATION LIST

Patent Literature

Patent Literature 1: JP 2000-35473A

DISCLOSURE OF INVENTION

Technical Problem

In the device capable of performing positioning employing the positioning system mentioned above (hereinafter sometimes referred to as "positioning device" for convenience of description), one antenna is provided for receiving carrier waves transmitted from the GNSS satellite (hereinafter sometimes simply referred to as "satellite"), in one example, like the portable device for position search disclosed in Patent Literature 1. However, when the positioning device includes one antenna, even if the position where the antenna is provided is considered, in one example, satellites to be supplemented from the relevant positioning device due to the influence of the human body or the like are limited, so it can happen that the positioning with sufficient accuracy fails to be performed or the positioning itself fails to be performed.

Further, even if the positioning system is simply provided with a plurality of antennas, it is difficult to be expected to perform the positioning with sufficient accuracy or to perform the positioning itself, in one example, for reasons as items (i) and (ii) mentioned below. The positioning using a scheme based on modulation of carrier waves is sometimes referred to as "code positioning" hereinafter, and the positioning using a scheme based on the phase of carrier waves is sometimes referred to as "carrier positioning" hereinafter.

(i) Case where Positioning Device Performs Code Positioning

In the case mentioned above, in the positioning device, carrier waves transmitted from one satellite is received by a plurality of antennas, and a reception circuit performs signal processing by treating them as different signals. In other words, in the case mentioned above, reception of carrier waves in the positioning device is a situation similar to multipath reception. Thus, in the case mentioned above, on the contrary, the reception performance of carrier waves in the positioning device deteriorates due to reception of carrier waves by a plurality of antennas, so it is difficult to be expected to perform the positioning with sufficient accuracy.

(ii) Case where Positioning Device Performs Carrier Positioning

In the case mentioned above, the physical distance between a plurality of antennas is much larger than the wavelength of carrier waves. For this reason, a positioning device in which a plurality of antennas is simply provided will fail to perform the carrier positioning.

In the present disclosure, there is provided a novel and improved information processing apparatus and information processing method, capable of improving the positioning accuracy using a plurality of antennas.

Solution to Problem

According to the present disclosure, there is provided an information processing apparatus including: a receiving unit including a plurality of antennas capable of receiving a carrier wave transmitted from a satellite; and a processing unit configured to perform positioning of a set first position on the basis of first phase information of carrier waves respectively received by a plurality of the antennas.

In addition, according to the present disclosure, there is provided an information processing apparatus including: a processing unit configured to perform positioning of a set first position on the basis of first phase information of carrier waves respectively received by a plurality of antennas capable of receiving a carrier wave transmitted from a satellite.

In addition, according to the present disclosure, there is provided an information processing method that is executed by an information processing apparatus, the method including: a step of performing positioning of a set first position on the basis of set first phase information of carrier waves respectively received by a plurality of antennas capable of receiving a carrier wave transmitted from a satellite.

Advantageous Effects of Invention

According to the present disclosure, it is possible to improve the positioning accuracy using a plurality of antennas.

Note that the effects described above are not necessarily limitative. With or in the place of the above effects, there may be achieved any one of the effects described in this specification or other effects that may be grasped from this specification.

BRIEF DESCRIPTION OF DRAWINGS

FIGS. 7A, 7B, and 7C are diagrams illustrated to describe the correction processing relating to the information processing method according to the present embodiment.

FIG. 9 is a diagram illustrated to describe the correction processing relating to the information processing method according to the present embodiment.

MODE(S) FOR CARRYING OUT THE INVENTION

Figure 1A:
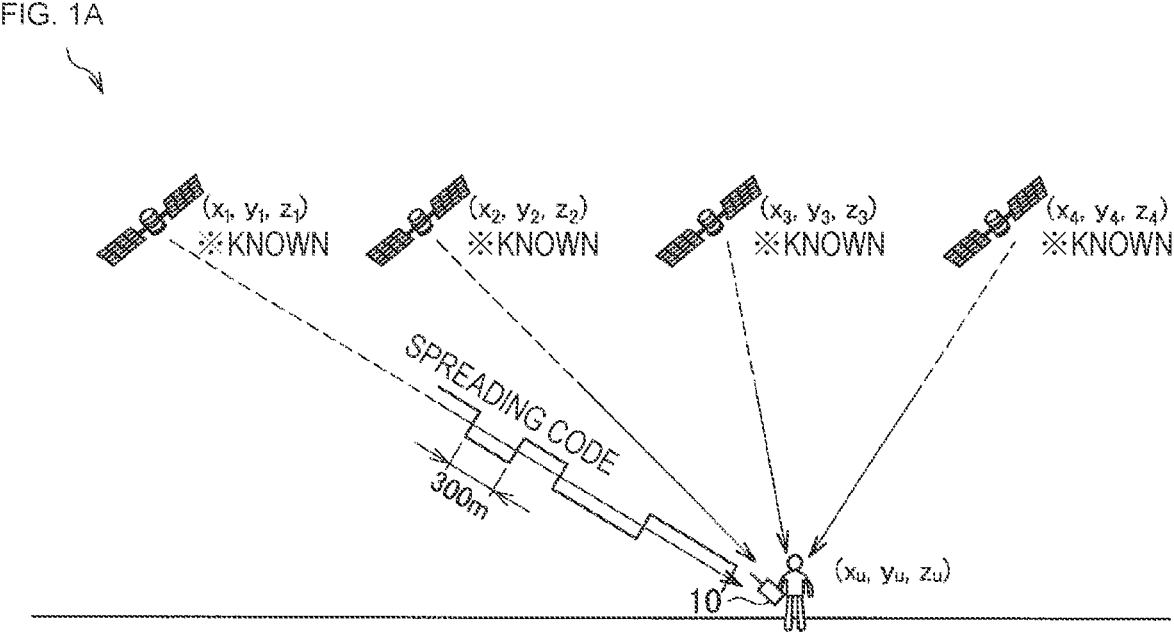
FIGS. 1A and 1B are diagrams illustrated to describe an overview of a positioning scheme in a positioning system using a satellite.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the following description is given in the order shown below.
1. Information processing method according to present embodiment
2. Information processing apparatus according to present embodiment
3. Program according to present embodiment
(Information Processing Method According to Present Embodiment)

An information processing method according to the present embodiment is first described. The following description is given as an example of a case in which an information processing apparatus according to the present embodiment performs processing relating to the information processing method according to the present embodiment.
[1] Existing Positioning Scheme A positioning scheme in a positioning system such as GNSS using a satellite is described, and then the information processing method according to the present embodiment is described.

Examples of the positioning in the positioning system include code positioning (positioning using the scheme based on modulation of carrier waves transmitted from a satellite) and carrier positioning (positioning using the scheme based on the phase of carrier waves) as described above.

Figure 1B:
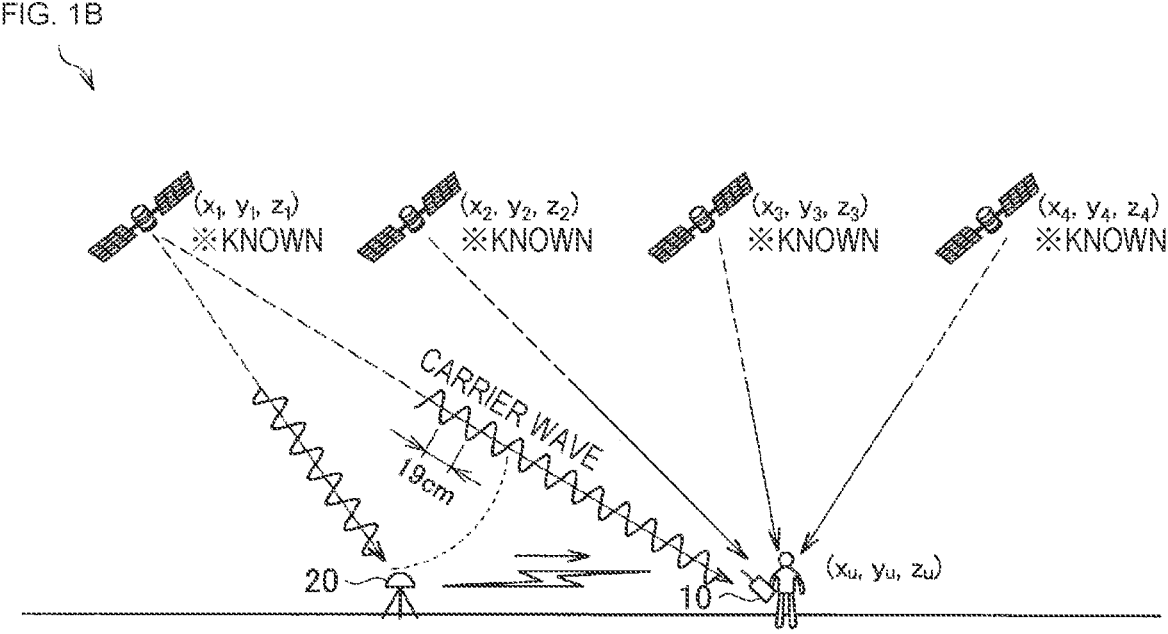

FIGS. 1A and 1B are diagrams illustrated to describe an overview of a positioning scheme in a positioning system using a satellite. FIG. 1A shows an overview of the code positioning in an information processing apparatus 10, and FIG. 1B shows an overview of the carrier positioning in the information processing apparatus 10. In FIG. 1B, a base station 20 whose position is known is also shown. Here, the information processing apparatus 10 corresponds to an example of the positioning device mentioned above.

In a case where the code positioning is performed, the information processing apparatus 10 obtains the distance from each satellite on the basis of a spreading code included in the carrier wave received from each satellite as shown in FIG. 1A. The information processing apparatus 10 obtains the distance from each satellite, in one example, on the basis of the difference between the retained spreading code and the received spreading code. Then, the information processing apparatus 10 specifies the position of the information processing apparatus 10 by the triangular survey using the distance to each satellite.

Here, one chip that is one unit of the spreading code relating to the code positioning is approximately 300 [m] as shown in FIG. 1A. For this reason, an error of approximately several [m] to several tens [m] may occur in the result of the code positioning. Thus, in the case where the code positioning is performed, the position of the information processing apparatus 10 is less likely to be determined with high accuracy.

Further, in a case where the carrier positioning is performed, in each of the information processing apparatus 10 and the base station 20, carrier waves transmitted from the satellite are received as shown in FIG. 1B. In addition, the information processing apparatus 10 acquires, from the base station 20, information associated with the position of the base station 20 and phase information associated with the carrier wave received by the base station 20. In addition, the information processing apparatus 10 estimates the number of waves of the carrier wave by, in one example, the real-time kinematic (hereinafter sometimes referred to as "RTK") operation, and calculates the distance to the base station 20 on the basis of "an error between the phase of the carrier wave received by the information processing apparatus 10 and the phase of the carrier wave received by the base station 20 that is indicated by the phase information of the carrier wave". Then, the information processing apparatus 10 specifies the position of the information processing apparatus 10 by using the position of the base station 20 that is indicated by the information associated with the position of the base station 20.

Here, the frequency of the carrier wave transmitted from the satellite is approximately 1.5 [GHz], so one wavelength that is one unit of the carrier wave relating to the carrier positioning is approximately 19 [cm] as shown in the portion FIG. 1B. Thus, an error in the result of the carrier positioning is approximately 2 [cm], and in the case where the carrier positioning is performed, it is possible to specify the position with higher accuracy than the code positioning.
[2] Information Processing Method According to Present Embodiment As described above, when the positioning device is provided with only one antenna, it can happen that the positioning fails to be performed with sufficient accuracy or the positioning itself fails to be performed.

More specifically, satellites supplemented from the relevant positioning device will be limited due to influence of the human body or the like, so the positioning by the biased arrangement of satellites is performed, and accordingly, variation of the obtained position from the correct position, large position jump, or the like may occur. In addition, the limitation on satellites supplemented from the positioning device due to influence of the human body or the like causes satellites necessary for the positioning calculation not to be aligned, and the positioning itself may also fail to be performed. Furthermore, in a case where an attitude of the positioning device is changed, the change of the attitude with the lapse of time causes the capture state of the satellite in the positioning device to be changed, so the ambiguity between the satellite and the positioning device in performing the carrier positioning becomes indefinite. As a result, in the positioning device, it is necessary to determine the ambiguity again after re-capturing of the satellite, so it takes time to perform the positioning.

Further, as described above, even if a plurality of antennas is simply provided in the positioning device, it is difficult to be expected to perform the positioning with sufficient accuracy or to perform the positioning itself for the reasons described in the items (i) and (ii) above.

Thus, the information processing apparatus according to the present embodiment is intended to improve the positioning accuracy by implementing the carrier positioning using a plurality of antennas.

The information processing apparatus according to the present embodiment performs the positioning of the position that is set on the basis of the phase information of the carrier waves respectively received by a plurality of antennas. Here, some or all of the antennas that receive the carrier wave may be antennas included in the information processing apparatus according to the present embodiment or may be external antennas of the information processing apparatus according to the present embodiment.

The phase information according to the present embodiment is data relating to the phase of the carrier wave received by an antenna. The phase information according to the present embodiment is obtained by, in one example, being subjected to signal processing on the carrier wave received by the antenna in a receiving unit described later.

An example of the phase information according to the present embodiment includes data represented by Formula 1 below. Here, "$\varphi_{iA}$" in Formula 1 below represents the phase information. In Formula 1 below, "f" represents the carrier frequency, and "c" in Formula 1 indicates high speed. In Formula 1 below, "$r_{iA}$" represents the true distance between an antenna A and a satellite i. In Formula 1 below, "$d_i$" represents an error of the phase information caused by the clock error of the satellite i. In Formula 1 below, "$\delta_A$" represents an error of phase information caused by the clock error of a device including the antenna A (or a device connected to the antenna A). Then, in Formula 1 below, "$N_{iA}$" represents ambiguity (ambiguity is an integer value) of the carrier wave that is transmitted from the satellite i and received by the antenna A. Moreover, needless to say, a method of representing the phase information according to the present embodiment is not limited to Formula 1 below.

$$\Phi_{iA} = \frac{f}{c} \cdot r_{iA} + d_i + \delta_A + N_{iA} \quad [\text{Math. 1}]$$

(Formula 1)

The phase information of the carrier waves respectively received by a plurality of antennas is hereinafter referred to as "first phase information".

An example of the position that is set according to the present embodiment includes any position such as a preset position or a position that is set by an operation of a user or the like of the information processing apparatus according to the present embodiment. The position according to the present embodiment is represented by, in one example, three-dimensional coordinates indicating a spatial position, or two-dimensional coordinates indicating a position on the plane.

The set position is hereinafter referred to as "first position".

More specifically, the information processing apparatus according to the present embodiment corrects the first phase information corresponding to each of a plurality of antennas as if the carrier wave is received at the first position. In other words, the information processing apparatus according to the present embodiment corrects the phase information of the carrier wave received by each of a plurality of antennas so that the positions corresponding to the plurality of antennas capable of respectively receiving the carrier waves may be gathered at any one point (corresponding to the first position).

Here, examples of the positions corresponding to each of the plurality of antennas according to the present embodiment include the phase center of each of the antennas. The position corresponding to each of the plurality of antennas is hereinafter referred to as "second position".

Then, the information processing apparatus according to the present embodiment performs the positioning of the first position on the basis of a plurality of pieces of phase information in which pieces of the first phase information are respectively corrected. In other words, the information processing apparatus according to the present embodiment performs the positioning of not the position (the second position) corresponding to each of the antennas but a virtual position that is set (the first position). The phase information in which the first phase information is corrected is hereinafter referred to as "second phase information".

Figure 2:
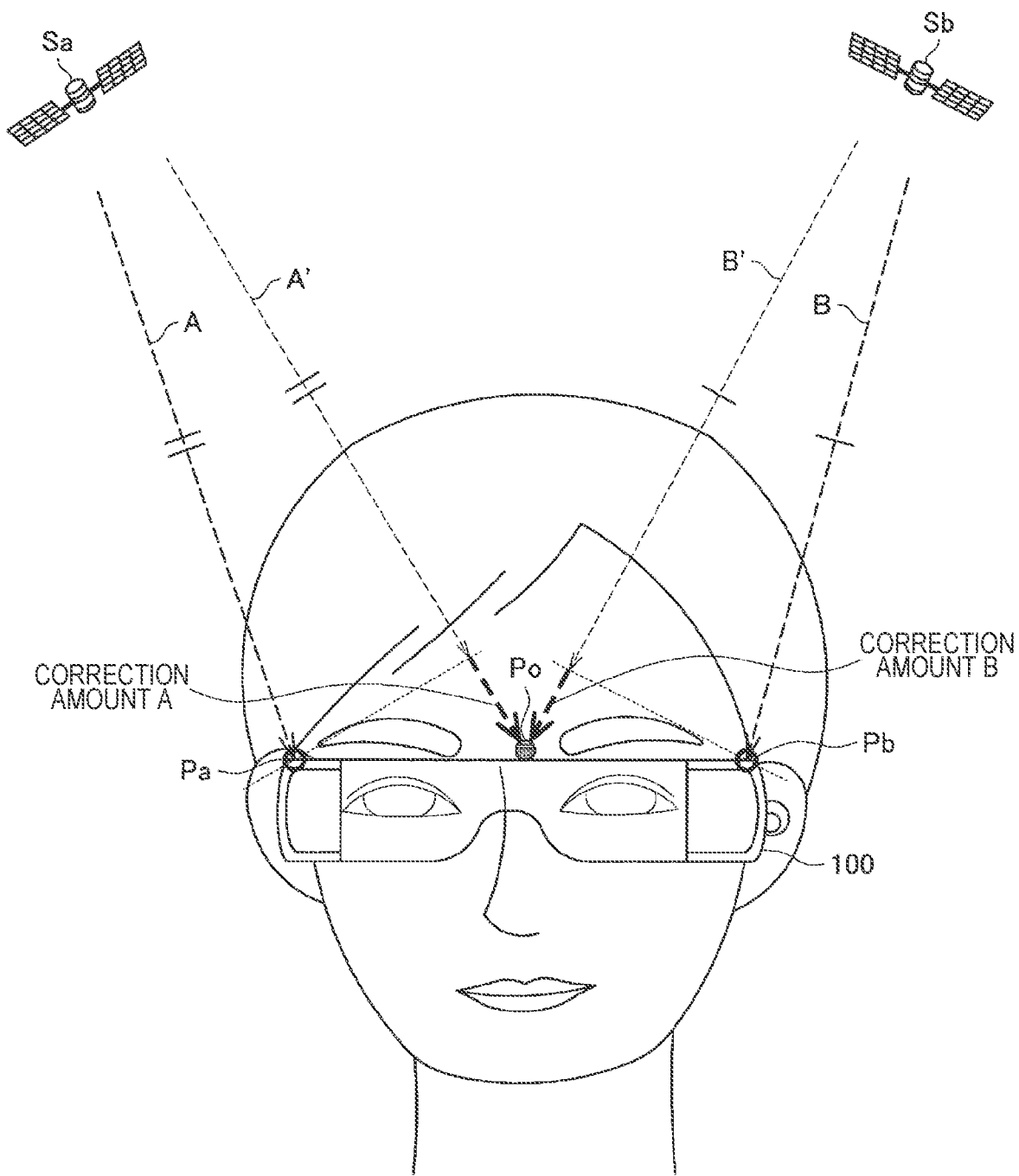
FIG. 2 is a diagram illustrated to describe an overview of an information processing method according to the present embodiment.

FIG. 2 is a diagram illustrated to describe an overview of the information processing method according to the present embodiment. FIG. 2 illustrates an example of a case where the information processing method according to the present embodiment is used in an information processing apparatus 100 according to the present embodiment, which includes two antennas.

Here, FIG. 2 illustrates an eyeglasses type wearable device used while being worn on the user's head as the information processing apparatus 100. Moreover, the information processing apparatus according to the present embodiment is not limited to the eyeglasses type wearable device as illustrated in FIG. 2. Other application examples of the information processing apparatus according to the present embodiment will be described later.

Further, although FIG. 2 illustrates the information processing apparatus 100 that performs the positioning using two antennas, the number of antennas capable of being used by the information processing apparatus according to the present embodiment is not limited to two. The information processing apparatus according to the present embodiment is capable of performing the positioning using three or more antennas. The following description is given of the information processing method according to the present embodiment by exemplifying the information processing apparatus 100 performing the positioning using two antennas, for simplicity of description.

In FIG. 2, "Pa" and "Pb" represent an example of the second position corresponding to each of the two antennas. In one example, in the information processing apparatus 100, the positional relationship between the two antennas is known, and the positional relationship between the second positions corresponding to the two respective antennas is also known.

Further, in FIG. 2, "Po" represents an example of the first position. Moreover, the example of the first position is not limited to the example illustrated in FIG. 2. In one example, the first position may be any position on the user such as the position of the upper portion of the user's head, the center position of the head, or the like, or may be any position that are not on the user.

Further, in FIG. 2, "A" represents the first phase information in a case where the carrier wave transmitted from a satellite Sa is received at the second position represented by "Pa" for convenience of description. In FIG. 2, "A'" represents the first phase information in a case where it is assumed that the carrier wave transmitted from the satellite Sa is received at the first position represented by "Po", for convenience of description.

In one example, there may be a case where the true distance between the second position represented by "Pa" and the satellite Sa differs from the true distance between the first position represented by "Po" and the satellite Sa. In such a case, it is necessary to correct the first phase information by a correction amount A in FIG. 2 so that the carrier wave transmitted from the satellite Sa is regarded as being received at the first position represented by "Po". Thus, the information processing apparatus 100 corrects the first phase information by the correction amount A in FIG. 2. Moreover, an example of the processing relating to the correction of the first phase information according to the present embodiment will be described later.

Further, in FIG. 2, "B" represents the first phase information in a case where the carrier wave transmitted from a satellite Sb is received at the second position represented by "Pb" for convenience of description. In FIG. 2, "B'" represents the first phase information in a case where it is assumed that the carrier wave transmitted from the satellite Sa is received at the first position represented by "Po" for convenience of description.

In one example, there may be a case where the true distance between the second position represented by "Pb" and the satellite Sb differs from the true distance between the first position represented by "Po" and the satellite Sb. In such a case, it is necessary to correct the first phase information by a correction amount B in FIG. 2 so that the carrier wave transmitted from the satellite Sb is regarded as being received at the first position represented by "Po". Thus, the information processing apparatus 100 corrects the first phase information by the correction amount B in FIG. 2.

As described above, the information processing apparatus 100 corrects each of the first phase information corresponding to the second position represented by "Pa" and the first phase information corresponding to the second position represented by "Pb". The correction of the first phase information by the information processing apparatus 100 as described above makes it possible for the information processing apparatus 100 to perform the carrier positioning by regarding the carrier wave received at the plurality of second positions corresponding to the respective plurality of antennas as being received at the first position represented by "Po".

Here, as described above, in a positioning device in which a plurality of antennas is simply provided, the physical distance between the plurality of antennas becomes very large as compared with the wavelength of the carrier wave, so the carrier positioning fails to be performed.

On the other hand, the information processing apparatus 100 corrects each piece of the first phase information corresponding to the respective plurality of antennas as if the carrier wave is received at the first position. Thus, the information processing apparatus 100 is capable of performing the positioning of the first position that is any one point that is set by the carrier positioning by performing the RTK operation based on the plurality of pieces of corrected second phase information.

Further, as described above, a positioning device in which a plurality of antennas is simply provided is in a situation similar to that of multipath reception, so it is difficult to be expected to perform the positioning with sufficient accuracy even if the code positioning is performed.

On the other hand, the information processing apparatus 100 performs the positioning of the first position by the carrier positioning on the basis of the first phase information of the carrier wave received by the plurality of antennas, so it is possible to specify the position with higher accuracy than the code positioning.

Thus, the information processing apparatus 100 according to the present embodiment is capable of improving the positioning accuracy using a plurality of antennas.

(Information Processing Apparatus According to Present Embodiment)

An example of processing relating to the information processing method according to the present embodiment is now described while describing an example of the configuration of the information processing apparatus according to the present embodiment. In addition, the following description is given of an example of the configuration of an information processing apparatus that performs the carrier positioning using two antennas for simplicity of description.

Figure 3:
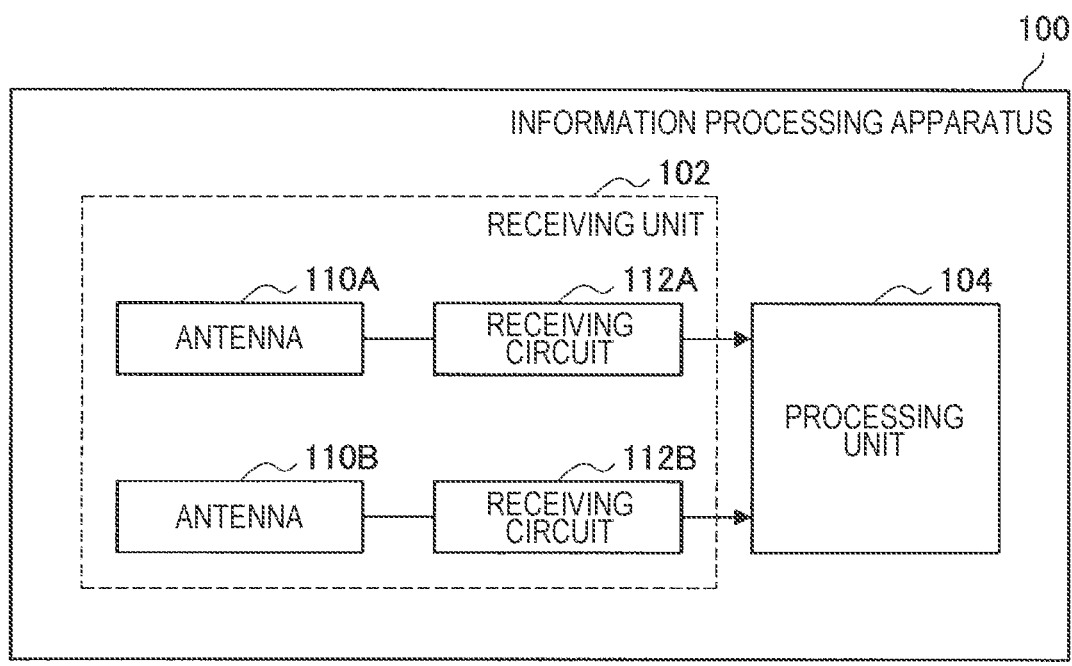
FIG. 3 is a block diagram illustrating an example of a configuration of an information processing apparatus according to the present embodiment.

[I] Example of Configuration of Information Processing Apparatus According to Present Embodiment FIG. 3 is a block diagram illustrating an example of the configuration of the information processing apparatus 100 according to the present embodiment. In one example, the information processing apparatus 100 includes a receiving unit 102 and a processing unit 104.

Further, the information processing apparatus 100 may include, in one example, a control unit (not shown), read only memory (ROM, not shown), random access memory (RAM, not shown), an attitude sensor (not shown) that is capable of detecting an attitude of the information processing apparatus 100, a storage unit (not shown), a communication unit (not shown), or the like. In the information processing apparatus 100, the respective components are connected to each other via, in one example, a bus that functions as a data transmission channel.

Further, the information processing apparatus 100 is driven by, in one example, power supplied from an internal power supply such as a battery provided in the information processing apparatus 100, power supplied from a connected external power supply, or the like. An example of the battery mentioned above includes a secondary battery such as a lithium-ion secondary battery.

The control unit (not shown) includes one or more processors that include arithmetic logic circuits such as microprocessor unit (MPU), various processing circuits, or the like, and controls the entire information processing apparatus 100. In addition, the control unit (not shown) may play a role of, in one example, the processing unit 104 in the information processing apparatus 100.

Moreover, the processing unit 104 may include a dedicated (or general-purpose) circuit (e.g., a processor or the like separate from the control unit (not shown)) that can implement the processing in the processing unit 104.

The ROM (not shown) stores control data such as programs or operation parameters used by the control unit (not shown). The RAM (not shown) temporarily stores programs or the like that are executed by the control unit (not shown).

The attitude sensor plays the role in detecting the attitude of the information processing apparatus 100. Here, the attitude of the information processing apparatus 100 detected by the attitude sensor can be regarded as the attitude of the antenna (or antenna connected to the information processing apparatus 100) included in the information processing apparatus 100. Examples of the attitude sensor include one or more sensors, such as an acceleration sensor, a geomagnetic sensor, an angular velocity sensor, an atmospheric pressure sensor, or the like, capable of detecting the attitude. In addition, the attitude sensor may be any one or more sensors that function as an inertial measurement unit (IMU).

The storage unit (not shown) is a storage means provided in the information processing apparatus 100, and stores data such as satellite orbital data (e.g., almanac data) relating to the information processing method according to the present embodiment or various data such as various applications. Moreover, some of the data relating to the information processing method according to the present embodiment may be recorded in the ROM.

Here, examples of the storage unit (not shown) include a magnetic recording medium such as a hard disk, a nonvolatile memory such as a flash memory, or the like. In addition, the storage unit (not shown) may be detachable from the information processing apparatus 100.

The communication unit (not shown) is a communication means provided in the information processing apparatus 100, and performs wireless or wired communication with an external device such as a base station via a network (or directly). Examples of the network according to the present embodiment include a wired network such as local area network (LAN) or wide area network (WAN), a wireless network such as wireless local area network (WLAN), the Internet using a communication protocol such as transmission control protocol/Internet protocol (TCP/IP), or the like.

The information processing apparatus 100 acquires phase information of the carrier wave received by an external device such as a base station from the external device by communication via the communication unit (not shown). The acquired phase information of the carrier wave is used, in one example, in the processing relating to the carrier-positioning scheme such as RTK operation. Moreover, the information processing apparatus 100 is also capable of performing the processing relating to the carrier-positioning scheme by acquiring the phase information of the carrier wave via a communication device having a communication function similar to that of the connected communication unit (not shown).

Here, examples of the communication unit (not shown) include the communication antenna and radio frequency (RF) circuit (wireless communication), the IEEE 802.15.1 port and transmission/reception circuit (wireless communication), the IEEE 802.11 port and transmission/reception circuit (wireless communication), the LAN terminal and transmission/reception circuit (wired communication), or the like. Moreover, the communication unit (not shown) and the receiving unit 102 may share some of their components.

The receiving unit 102 includes a plurality of antennas capable of receiving the carrier wave transmitted from a satellite, and the receiving unit 102 receives the carrier wave and transmits the first phase information of the carrier wave to the processing unit 104.

The receiving unit 102 includes, in one example, antennas 110A and 110B and receiving circuits 112A and 112B.

The antennas 110A and 110B play the role in receiving the carrier wave transmitted from a satellite.

In a case where the information processing apparatus 100 is, in one example, a wearable device worn on the human body like the eyeglasses type wearable device illustrated in FIG. 2, the antennas 110A and 110B are arranged so that each can cover a satellite that fails to be captured due to the influence of the human body. In the case where the information processing apparatus 100 is applied to the eyeglasses type wearable device illustrated in FIG. 2 as an example, the antennas 110A and 110 are arranged so that they are positioned respectively on the left and right of the eyeglasses type wearable device at the time of wearing as illustrated in FIG. 2.

Further, in the information processing apparatus 100, the positional relationship between the plurality of antennas 110A and 110B in the information processing apparatus 100 is known.

The receiving circuit 112A performs signal processing on the signal of the carrier wave received by the antenna 110A and delivers the first phase information to the processing unit 104. In addition, the receiving circuit 112B performs signal processing on the signal of the carrier wave received by the antenna 110B and delivers the first phase information to the processing unit 104.

The receiving circuits 112A and 112B each includes, in one example, one or more amplifiers, frequency converters, carrier recovery circuits, phase counters, and the like. Moreover, the configuration of the receiving circuits 112A and 112B is not limited to the example mentioned above and may be any configuration capable of obtaining the first phase information by performing the signal processing on the signal of the carrier wave.

The processing unit 104 plays a leading role in performing the processing relating to the information processing method according to the present embodiment. The processing unit 104 performs, in one example, the positioning processing described below as the processing relating to the information processing method according to the present embodiment.

(1) Positioning Processing

The processing unit 104 performs positioning of the first position on the basis of the first phase information of the carrier waves respectively received by the plurality of antennas 110A and 110B.

The processing unit 104 corrects the first phase information corresponding to each of the plurality of antennas 110A and 110B as if the carrier wave is received at the first position.

The correction of the first phase information is described by exemplifying a case of correcting the first phase information of the carrier wave received by one antenna of the plurality of antennas 110A and 110B.

The processing unit 104 corrects the first phase information on the basis of "first distance between the first position and the second position corresponding to one antenna" and "positional relationship between the first position, the second position, and the satellite that transmits the received carrier wave".

Here, the first position is a position that is set, and the second position is known from the positional relationship of the antenna. Thus, the processing unit 104 is capable of determining the first distance uniquely, in one example, by obtaining the Euclidean distance between the first position and the second position.

Further, the processing unit 104 estimates the "positional relationship between the first position, the second position, and the position of the satellite" on the basis of the "position of the satellite", "the position of the information processing apparatus 100", and "the attitude of the information processing apparatus 100". The processing unit 104 may estimate the "positional relationship between the first position, the second position, and the satellite" further on the basis of the azimuth of the information processing apparatus 100. The "positional relationship between the first position, the second position, and the satellite" is sometimes hereinafter simply referred to as "positional relationship".

The processing unit 104 obtains the position of the satellite from satellite orbital data or the like.

The processing unit 104 specifies the position and azimuth of the information processing apparatus 100 on the basis of, in one example, the position and azimuth that are set by an input operation by a user or the like of the information processing apparatus 100.

Further, the processing unit 104 may obtain the position and azimuth of the information processing apparatus 100 by, in one example, code positioning, simultaneous localization and mapping (SLAM), or the like. In the case of performing the code positioning, the processing unit 104 performs the code positioning based on, in one example, the signal of carrier wave received by one antenna of a plurality of antennas. In addition, in the case of performing the code positioning, the processing unit 104 may perform the code positioning by electrically synthesizing simply the signal of carrier wave received by a plurality of antennas.

Moreover, when the first phase information is corrected by the positioning processing according to the present embodiment, then the processing unit 104 may perform the code positioning using the correction result or may obtain the position and azimuth repeatedly from the result obtained by performing the carrier positioning.

The processing unit 104 specifies the attitude of the information processing apparatus 100 by using the attitude sensor (not shown).

More specifically, the processing unit 104 obtains a difference in path on the basis of, in one example, the first distance and the positional relationship obtained as described above. Here, the difference in path according to the present embodiment is a difference between the "second distance between the satellite that transmitted the carrier wave received by one antenna and the first position" and the "third distance between the relevant satellite and the second position".

Then, the processing unit 104 corrects the first phase information on the basis of the obtained difference in path.

Figure 4:
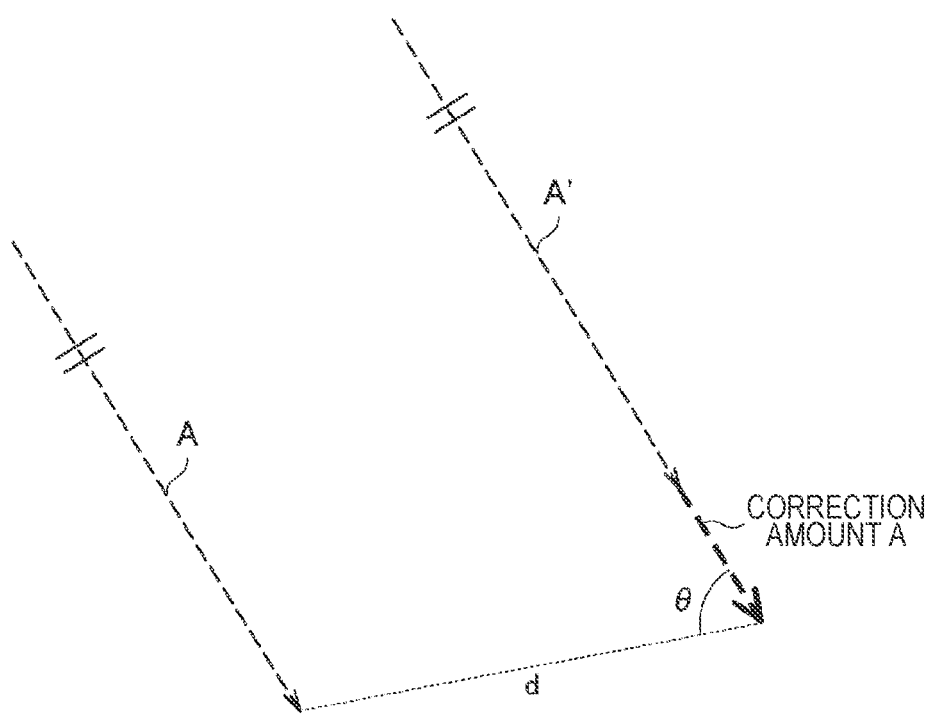
FIG. 4 is a diagram illustrated to describe an example of processing for correcting first correction information that relates to the information processing method according to the present embodiment.

FIG. 4 is a diagram illustrated to describe an example of processing for correcting first correction information relating to the information processing method according to the present embodiment. FIG. 4 illustrates a case of correcting the first phase information corresponding to the second position represented by "Pa" illustrated in FIG. 2.

Here, in FIG. 4, "d" is a distance between the second position represented by "Pa" and the first position represented by "Po" illustrated in FIG. 2, which corresponds to the first distance. In addition, in FIG. 4, "d" can be regarded as the length of a vector from the second position to the first position.

The distance between the satellite Sa and the information processing apparatus 100 illustrated in FIG. 2 is as large as approximately 20,000 [km], so a vector from the satellite Sa to the second position represented by "Pa" and a vector from the satellite Sa to the first position represented by "Po" can be regarded as parallel.

Thus, the processing unit 104 is capable of obtaining the difference in path by, in one example, Formula 2 below. Here, in Formula 2, "θ" is specified from the positional relationship.

Difference in path=$d \cdot \cos(\theta)$ (Formula 2)

Then, the processing unit 104 obtains the correction amount A from the obtained difference in path. The processing unit 104 obtains, as the correction amount A, in one example, a correction value of the number of waves of the carrier wave from the frequency of the carrier wave and the difference in path.

Moreover, a method of calculating the correction amount A according to the present embodiment is not limited to the example mentioned above. The processing unit 104 is capable of obtaining the correction amount A, in one example, by any calculation method capable of regarding the carrier wave transmitted from the satellite Sa as being received at the first position represented by "Po".

When the correction amount A is obtained, the processing unit 104 corrects the first phase information, in one example, by adding the correction amount A to the first phase information to obtain the second phase information.

The processing unit 104 performs the processing relating to the acquisition of the second phase information described above on the carrier waves received respectively by the plurality of antennas 110A and 110B. Then, the processing unit 104 performs the positioning of the first position on the basis of a plurality of pieces of second phase information in which the respective pieces of first phase information are corrected.

The processing unit 104 performs the RTK operation using the plurality of pieces of second phase information corresponding to the carrier waves respectively transmitted from the plurality of satellites. Here, the RTK operation using the plurality of pieces of second phase information is similar to the RTK operation in the existing carrier positioning.

Thus, the processing unit 104 is capable of specifying the first position by the carrier positioning using a plurality of antennas.

Here, in the information processing apparatus 100, the carrier positioning is performed by using a plurality of antennas such as the antennas 110A and 110B, so the carrier wave transmitted from the same satellite may be received by a plurality of antennas.

In a case where a plurality of pieces of first phase information of the carrier wave transmitted from the same satellite is acquired, the processing unit 1-4 performs the positioning of the first position on the basis of one piece of first phase information selected from the acquired plurality of pieces of first phase information or phase information generated from the acquired plurality of pieces of first phase information. The phase information generated from the plurality of pieces of first phase information is hereinafter referred to as "third phase information" to distinguish it from the first phase information and the corrected second phase information.

The processing unit 104 selects one piece of first phase information by performing, in one example, the processing described in the item (i) below (processing of selecting first phase information from the plurality of pieces of first phase information). The processing unit 104 performs the positioning of the first position on the basis of the selected one piece of the first phase information, in one example, in a case where the processing described in the item (i) below is performed.

(i) Processing of Selecting First Phase Information from a Plurality of Pieces of First Phase Information The processing unit 104 selects one piece of first phase information on the basis of a power ratio between the received carrier wave and noise. The processing unit 104 selects the one piece of first phase information by referring to a carrier-to-noise ratio (C/N) value that is an index corresponding to the power ratio between the carrier wave and the noise.

More specifically, the processing unit 104 selects, in one example, the first phase information corresponding to an antenna having a larger C/N value among the respective antennas.

Here, the larger the C/N value, the smaller the noise component. In addition, in a case where the carrier wave transmitted from the satellite is received by the antenna with diffraction due to the influence or the like of the human body such as the head of the user, the C/N value decreases.

Thus, the selection of the first phase information corresponding to the antenna having the larger C/N value as described above makes it possible for the processing unit 104 to select the first phase information used to be capable of performing the carrier positioning with higher accuracy.

Further, the processing unit 104 generates the third phase information by, in one example, the processing described in item (ii) below (processing of generating the third phase information) and performs the positioning of the first position on the basis of the generated third phase information.

(ii) Processing of Generating Third Phase Information

The processing unit 104 generates the third phase information by performing averaging processing on the acquired plurality of pieces of first phase information.

The averaging processing on the plurality of pieces of first phase information allows a noise component in the generated third phase information to be further reduced.

Here, in one example, the processing unit 104 may perform the averaging processing by applying weight based on the power ratio of the received carrier wave and the noise or may perform the averaging processing without applying the weight.

In a case of applying the weight based on the power ratio between the carrier wave and the noise, the processing unit 104 refers to, in one example, the C/N value of each antenna. Then, the processing unit 104 applies weight to the first phase information corresponding to an antenna whose C/N value is equal to or larger than a set threshold value (or an antenna whose C/N value is larger than the threshold value) so that the weight of the first phase information increases. The processing unit 104 applies weight by specifying a weighting coefficient with reference to a table (or a database) in which C/N values and weighting coefficients are associated with each other. The table is stored in a recording medium such as a storage unit (not shown). In addition, the processing unit 104 may apply weight, in one example, by specifying a weighting coefficient used to perform an operation of any algorithm capable of calculating a weighting coefficient based on the C/N value and by identifying the weighting coefficient.

In one example, the processing unit 104 selectively performs the processing described in the item (i) above or the processing described in the item (ii) above.

Further, in one example, the processing unit 104 may perform the processing that is set between the processing described in the item (i) above or the processing described in the item (ii) above. The processing that is set may be a fixed processing that is set in advance or may be changeable on the basis of a user operation or the like.

In a case where the processing described in the item (i) above or the processing described in the item (ii) above is selectively performed, the processing unit 104 performs, in one example, either the processing described in the item (i) above or the processing described in the item (ii) above, on the basis of the power ratio of the received carrier wave and the noise.

The processing unit 104 refers to the C/N value of each of the plurality of antennas and performs either the processing described in the item (i) above or the processing described in the item (ii) above, in one example, by comparing a difference between the largest C/N value and the smallest C/N value (hereinafter referred to as "difference between C/N values") to the set threshold value.

As an example, in a case where the difference between C/N values is larger than the set threshold value (or case where the difference between C/N values is equal to or larger than the relevant threshold value), the processing unit 104 performs the processing described in the item (i) above. In addition, in one example, in a case where the difference between C/N values is equal to or smaller than the set threshold value (or case where the difference between C/N values is smaller than the relevant threshold value), the processing unit 104 performs the processing described in the item (ii) above.

Moreover, a method of selectively performing either the processing described in the item (i) above or the processing described in the item (ii) above is not limited to the example described above. In one example, the processing unit 104 may select the processing described in the item (i) above or the processing described in the item (ii) above in accordance with a predetermined rule such as random selection to perform the selected processing.

The processing unit 104 performs the positioning of the first position by the carrier positioning using the plurality of antennas 110A and 110B by, in one example, performing the positioning processing as described above.

Here, the processing unit 104 corrects the respective pieces of first phase information corresponding to the plurality of antennas as if the carrier wave is received at the first position and performs the RTK operation based on the corrected plurality of pieces of second phase information, so the processing unit 104 performs the positioning of the first position. Thus, the processing unit 104 is capable of performing the positioning of the first position that is any one point that is set by the carrier positioning.

Further, the processing unit 104 performs the positioning of the first position by the carrier positioning, so it is possible to specify the position with higher accuracy than the code positioning.

Thus, the information processing apparatus 100 including the processing unit 104 is capable of improving the positioning accuracy using a plurality of antennas.

Further, the processing unit 104 further performs filter processing using the position, speed, or the like obtained by the RTK operation together with IMU, SLAM, or the like, and may recalculate one or more of position, azimuth, and speed. By performing the recalculation as described above, the information processing apparatus 100 implements improvement in positioning accuracy, interpolation of data output interval, and interpolation when the RTK operation fails to be performed. In addition, in a case where interpolation as described above is assumed to be performed, the information processing apparatus 100 may perform the carrier positioning, in one example, at a set frequency such as once per one second.

Moreover, the processing relating to the information processing method according to the present embodiment is not limited to the processing described in the item (1) above (positioning processing). In one example, the processing unit 104 may further perform correction processing for correcting the characteristics of the antenna as described below as the processing relating to the information processing method according to the present embodiment.

(2) Correction Processing

In a case where the information processing apparatus 100 is a wearable device such as the eyeglasses type wearable device that is worn on a human body as illustrated in FIG. 2 or a communication device such as smartphones or mobile phones, the attitude of the information processing apparatus 100 is changeable. In addition, in a case where the attitude of the information processing apparatus 100 is changed, the attitude of the antennas 110A and 110B of the information processing apparatus 100 (or attitude of an external antenna connected to the information processing apparatus 100) is also changed with the change of the attitude of the information processing apparatus 100.

Here, in a case where the attitude of the antenna is changed, the reception point of the carrier wave at the antenna varies depending on the incident angle of the carrier wave to the antenna. The variation in the reception point can lead to a decrease in the positioning accuracy.

Thus, the processing unit 104 performs the correction processing to correct characteristics of the antenna. Examples of the characteristics of the antenna include "phase center variation (PCV)" and an antenna offset (hereinafter sometimes referred to as "phase center offset (PCO)").

(2-1) Correction of Antenna Characteristics in Existing Carrier-Positioning Scheme The characteristics of antenna in the existing carrier-positioning scheme are described and then the correction processing according to the present embodiment is described.

In the case where the existing carrier positioning is performed, the positioning accuracy is improved by, in one example, "performing correction of the characteristics of antenna". In the existing carrier positioning, the characteristics of antenna is corrected by performing one or both of PCV correction and PCO correction as described below.

(a) PCV Correction

The PCV is a characteristic that the reception point of the carrier wave at the antenna varies depending on the incident angle of the carrier wave to the antenna. In other words, the PCV is a characteristic indicating variation in the electric center with respect to the incident angle of the carrier wave in the antenna.

Figure 5A:
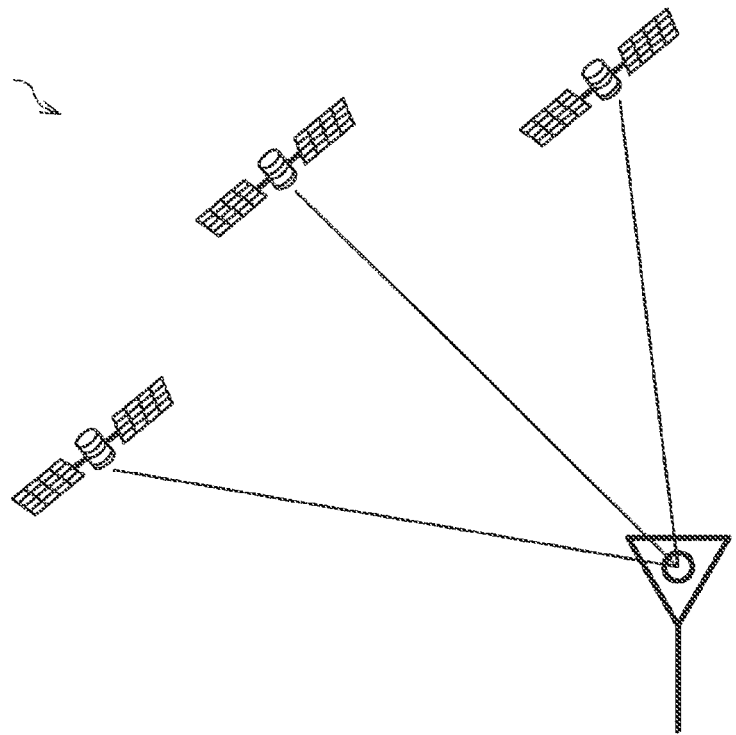
FIGS. 5A and 5B are diagrams illustrated to describe the correction processing relating to the information processing method according to the present embodiment.
Figure 5B:
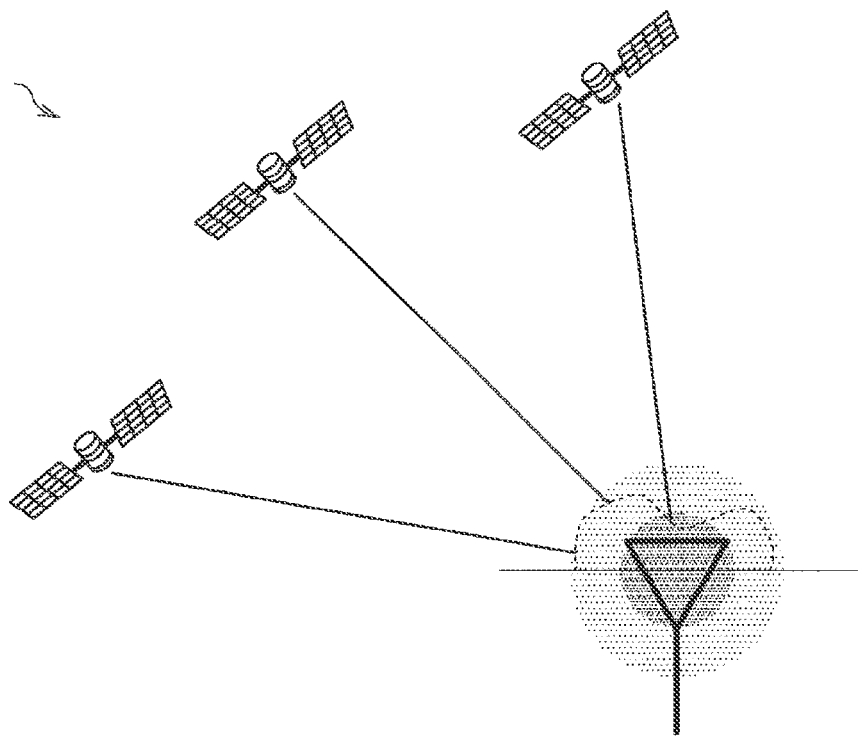

FIGS. 5A and 5B are diagrams illustrated to describe the correction processing relating to the information processing method according to the present embodiment. FIG. 5A shows an example of a case where PCV is satisfactory, and a portion shows an example of a case where PCV is unsatisfactory.

In the case where PCV is satisfactory, the reception point of the carrier wave at the antenna is one point (variation of the reception point is approximately several [mm]) as shown in FIG. 5A. On the other hand, in the case where the PCV is unsatisfactory, the reception point of the carrier wave at the antenna does not become one point (variation of the reception point is approximately several [cm]) as shown in FIG. 5B.

FIGS. 6A, 6B, 7A, 7B, and 7C are diagrams illustrated to describe the correction processing relating to the information processing method according to the present embodiment.

Figure 6A:
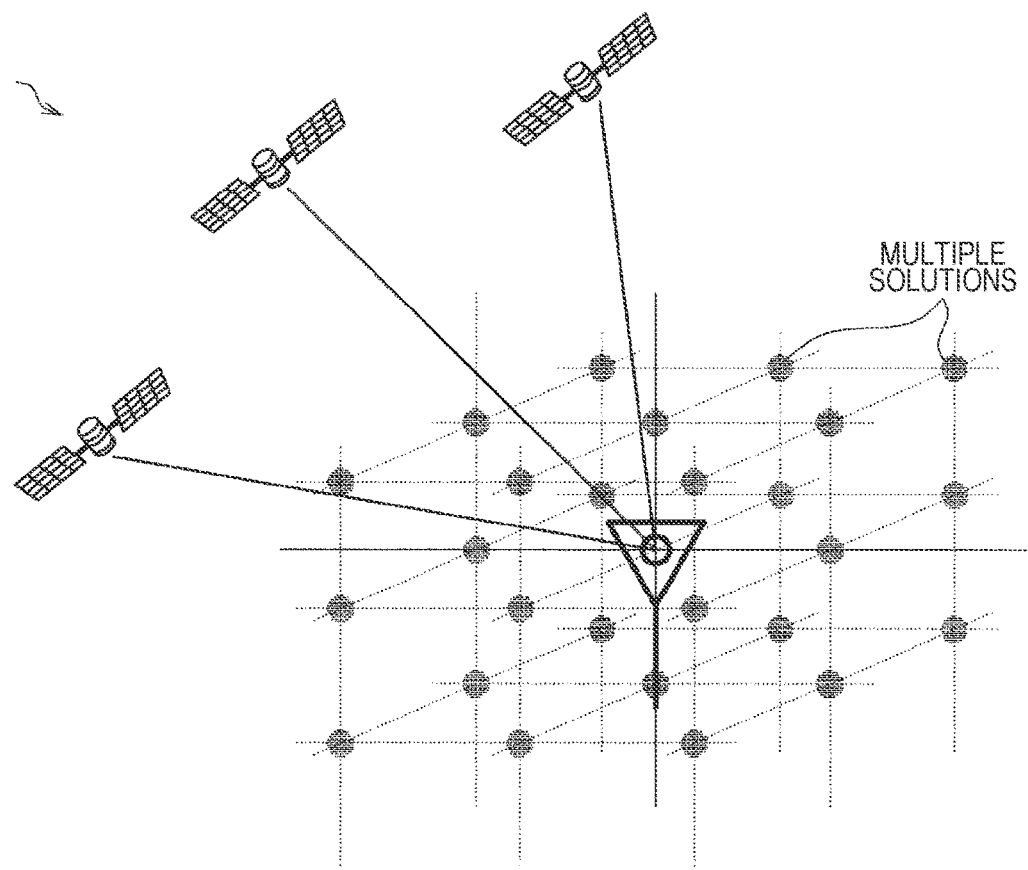
FIGS. 6A and 6B are diagrams illustrated to describe the correction processing relating to the information processing method according to the present embodiment.
Figure 6B:
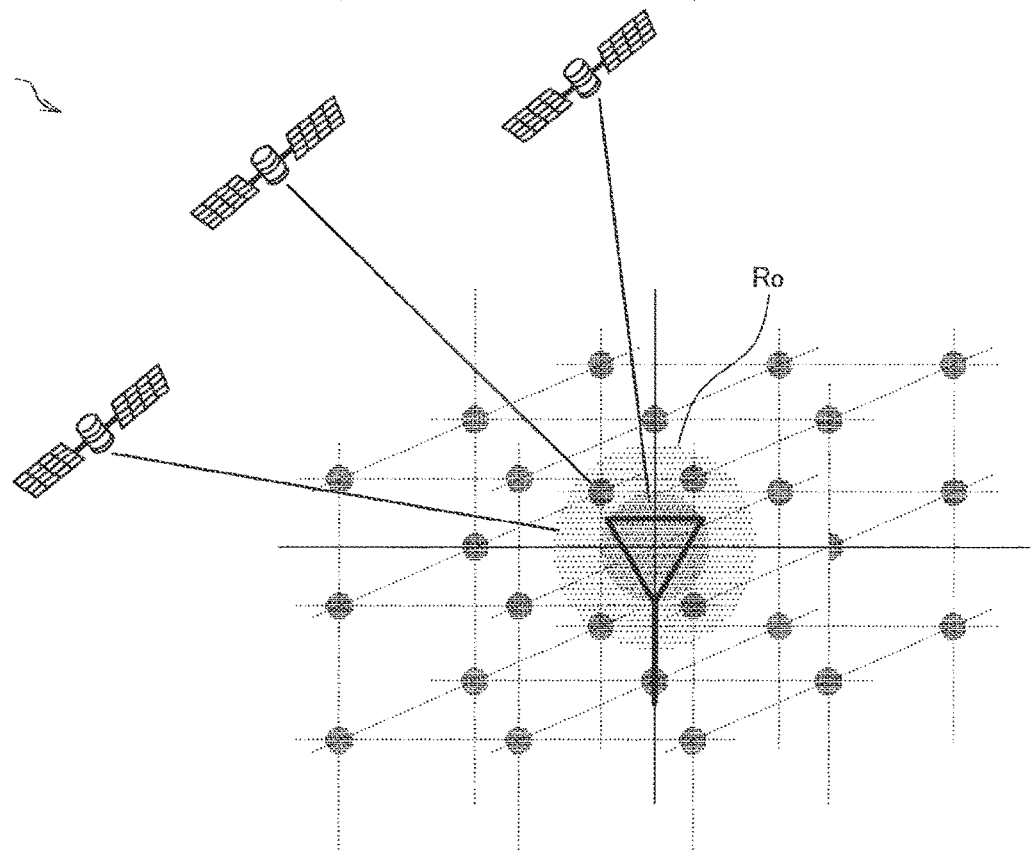

FIGS. 6A and 6B illustrate an overview of the processing relating to specifying the reception point of the carrier wave at the antenna. FIG. 6A shows an example of a case where PCV is satisfactory, and FIG. 6B shows an example of a case where PCV is unsatisfactory.

Further, FIGS. 7A, 7B, and 7C illustrate an overview of the double phase difference in the carrier-positioning scheme. In FIGS. 7A, 7B, and 7C, "Base" indicates an antenna on the base station side. In addition, in FIGS. 7A, 7B, and 7C, "Rover" indicates an antenna on the mobile station side, that is, an antenna on the information processing apparatus side.

The inter-satellite phase difference (the incident angle to the antenna is different) shown in FIG. 7A and the inter-receiver phase difference shown in FIG. 7B (the direction of the antenna is different) allow the double phase difference shown in FIG. 7C to be obtained.

In the carrier-positioning scheme, one solution is selected as a Fix solution from multiple solutions (multiple Float solutions), thereby obtaining a reception point of the carrier wave at the antenna. Here, Fix refers to a positioning processing state in which, in one example, in carrier position positioning, an integer value bias is determined and highly accurate positioning is possible.

In the case where the PCV is satisfactory, the probability (Fix rate) in which a solution selected from among the multiple solutions coincides with the reception point of the carrier wave at the actual antenna is high as shown in FIG. 6A.

On the other hand, in the case where the PCV is unsatisfactory, there may be a range in which the Float solution is offset depending on the incident angle of the carrier wave, such as Ro shown in FIG. 6B. Thus, in the case where the PCV is unsatisfactory, it is difficult to obtain the correct Fix solution (or a Fix solution fails to be obtained). In addition, in the case where the PCV is unsatisfactory, it sometimes takes more time to obtain the Fix solution than the case where the PCV is satisfactory. Furthermore, in a case where the double phase difference is obtained as shown in FIG. 7C, the error of the Fix solution may become large in some cases. Here, the degree of influence of PCV is considered to be caused by the ratio of the wavelength of the carrier wave.

In one example, in the case where the reception point does not become one point as shown in FIG. 5B, the incident angle of the carrier wave to the antenna (corresponding to the elevation angle and azimuthal angle of the satellite transmitting the carrier wave with respect to the antenna) makes the delay amounts at the time of reception of the carrier wave different.

Thus, as the processing relating to the correction of the PCV, "processing of delaying the signal of the carrier wave received by the antenna by a delay amount corresponding to the incident angle of the carrier wave to the antenna" is performed. The signal of the carrier wave received by the antenna is delayed by the delay amount corresponding to the incident angle of the carrier wave to the antenna, so even in the case where the PCV is unsatisfactory as shown in FIG. 5B, it is possible to obtain one Fix solution from among multiple solutions (multiple Float solutions), which is similar to the case the PCV is unsatisfactory as shown in FIG. 5A.

Here, in the processing relating to the PCV correction, in one example, the correction value of the PCV corresponding to the delay amount corresponding to the incident angle of the carrier wave to the antenna is specified by using "a correction table (or correction database) in which the incident angle (elevation angle and azimuthal angle) of the carrier wave to the antenna is associated with the correction value of the PCV in advance". Then, the PCV is corrected by correcting the signal of the carrier wave received by the antenna on the basis of the specified correction value of the PCV.

(b) PCO Correction

The PCO is an offset of the position from a reference point of the antenna to a reception point of the carrier wave at the antenna.

The offset mentioned above varies depending on, in one example, the incident angle of the carrier wave to the antenna, and the variation in offsets makes the delay amount at the time of reception of the carrier wave different.

Thus, as the processing relating to the PCO correction, "processing of delaying the signal of the carrier wave received by the antenna by the delay amount of the offset corresponding to the incident angle of the carrier wave to the antenna" is performed.

Here, in the processing relating to the PCO correction, in one example, the correction value of the PCO corresponding to the delay amount corresponding to the incident angle of the carrier wave to the antenna is specified by using "a correction table (or correction database) in which the incident angle (elevation angle and azimuthal angle) of the carrier wave to the antenna is associated with the correction value of the offset in advance". Then, the PCO is corrected by correcting the signal of the carrier wave received by the antenna on the basis of the specified correction value of the PCO.

(2-2) Problems that May Occur in Existing Antenna Characteristic Correction

In a case where the antenna is fixed to be horizontal to the ground, it is possible to uniquely specify the incident angle of the carrier wave to the antenna from the received signal. Thus, in the case the antenna is fixed to be horizontal to the ground, it is possible to make the reception point of the carrier wave at the antenna constant, so it is possible to correct the characteristics of the antenna by one or both of the PCV correction described in the item (a) above and the and the PCO correction described in the item (b) above.

Here, as described above, the attitude of the antenna is changed with the change in the attitude of the device, so the reception point of the carrier wave at the antenna can vary depending on the attitude of the antenna.

However, in the existing antenna characteristic correction as described in the items (a) and (b) above, the variation in the reception point of the carrier wave at the antenna due to the change in the attitude of the antenna as described above is not taken into consideration. Thus, even if the existing antenna characteristic correction is applied to a device whose attitude is changeable such as wearable devices, there is a possibility that the positioning accuracy may be deteriorated due to the variation in the reception point of the carrier wave at the antenna that is caused by the change in the attitude of the antenna.

Thus, even if the existing antenna characteristic correction is applied to a device whose attitude is changeable, it is not necessarily capable of improving the positioning accuracy.

Further, examples of a method of improving the positioning accuracy in the case where the carrier positioning is performed include "use of an antenna having satisfactory antenna characteristics".

However, an antenna having satisfactory antenna characteristics has a large antenna size and is very expensive. For this reason, it is difficult to apply the antenna having satisfactory antenna characteristics to a device whose attitude is changeable such as any wearable device used while being worn on a human body.

(2-3) Correction Processing According to Present Embodiment (2-3-1) Overview of Correction Processing Thus, the processing unit 104 corrects the characteristics of the antenna on the basis of the attitude of the antenna that receives the carrier wave. The processing unit 104 performs one or both of the PCV correction and the PCO (antenna offset) correction on the basis of the attitude of the antenna.

In the case of performing the PCV correction, the processing unit 104 specifies the delay amount corresponding to the incident angle of the carrier wave to the antenna on the basis of the attitude of the antenna and the incident angle of the carrier wave to the antenna, and corrects the specified delay amount.

Further, in the case of performing the PCO correction, the processing unit 104 specifies the delay amount of the offset corresponding to the incident angle of the carrier wave to the antenna on the basis of the attitude of the antenna and the incident angle of the carrier wave to the antenna, and corrects the specified delay amount of the offset.

As described above, the correction of the characteristics of the antenna in consideration of the attitude of the antenna allows the delay amount caused by the variation in the reception point of the carrier wave at the antenna due to the change of the attitude of the antenna in the signal of the carrier wave received by the antenna to be corrected.

Further, the processing described in the item (1) above (positioning processing) is performed on the basis of the signal of the carrier wave in which the characteristics of the antenna are corrected, so it is possible to determine the position while preventing the deterioration in the positioning accuracy due to the variation in the reception point of the carrier wave at the antenna caused by the change in the attitude of the antenna.

Thus, the processing unit 104 is capable of further improving the accuracy of the positioning using the carrier-positioning scheme by further performing the correction processing mentioned above as the processing relating to the information processing method according to the present embodiment.

(2-3-2) Example of Correction Processing

The correction processing is now described in more detail. The processing unit 104 corrects the characteristics of the antenna on the basis of the attitude of the antenna.

The processing unit 104 specifies, as the attitude of the antenna, the attitude of the information processing apparatus 100 that is specified by, in one example, an attitude sensor (not shown).

Further, the processing unit 104 acquires "information (hereinafter referred to as "azimuth and elevation angle information") indicating the elevation angle between the direction in which the satellite that transmitted the carrier wave exists and the ground (an example of the reference plane)".

Here, the azimuth in which the satellite that transmitted the carrier wave exists and the elevation angle to the ground (an example of the reference plane) can be obtained by, in one example, satellite orbital data such as almanac data.

Figure 8:
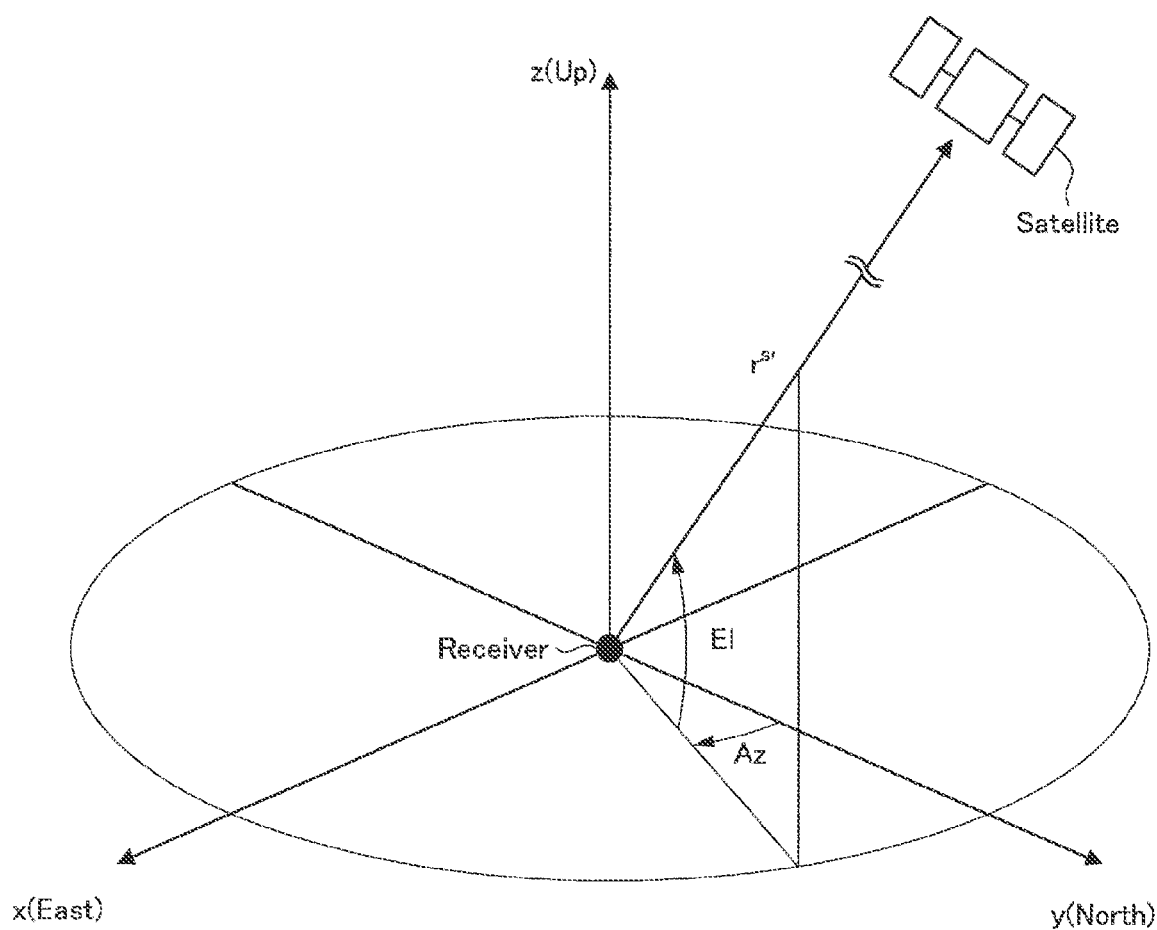
FIG. 8 is a diagram illustrated to describe the correction processing relating to the information processing method according to the present embodiment.

FIG. 8 is a diagram illustrated to describe the correction processing relating to the information processing method according to the present embodiment, and illustrates an example of the azimuthal angle Az at which a satellite ("Satellite" illustrated in FIG. 8) exists and the elevation angle El of the satellite to the ground (an example of the reference plane). In FIG. 8, the azimuthal angle Az and the elevation angle El are represented with reference to the position of a device having an antenna ("Receiver" illustrated in FIG. 8).

In one example, it is possible to acquire the azimuthal angle Az and the elevation angle El as illustrated in FIG. 8 by using the orbital data of the satellite.

Moreover, a method of acquiring the azimuth and elevation angle information is not limited to the above description, and the processing unit 104 may acquire the azimuth and elevation angle information using any method capable of acquiring the azimuth and elevation angle information.

Then, the processing unit 104 specifies the incident angle of the carrier wave to the antenna on the basis of the azimuth and elevation angle information. The incident angle of the carrier wave to the antenna is represented by, in one example, the elevation angle and the azimuthal angle.

Here, in the case where an antenna is fixed to be horizontal to the ground, that is, the case where the reference plane of the antenna and the ground are horizontal, the incident angle of the carrier wave to the antenna specified on the basis of the azimuth and elevation angle information corresponds to the incident angle of the carrier wave to the antenna. In other words, the incident angle of the carrier wave to the antenna specified on the basis of the azimuth and elevation angle information is the incident angle in the case of using the ground as a reference, not the incident angle in which the attitude of the antenna is considered.

Thus, the processing unit 104 calculates, in one example, the "incident angle of the carrier wave to the antenna corresponding to the attitude of the antenna" (hereinafter referred to as "incident angle corresponding to the attitude of the antenna"). Here, the incident angle corresponding to the attitude of the antenna corresponds to the incident angle using the reference plane of the antenna as a reference. The incident angle corresponding to the attitude of the antenna is represented by, in one example, the elevation angle and the azimuthal angle.

The processing unit 104 calculates the incident angle corresponding to the attitude of the antenna by, in one example, adding or subtracting an adjustment value corresponding to the attitude to or from the incident angle of the carrier wave to the antenna specified on the basis of the azimuth and elevation angle information, that is, the incident angle in the case of using the ground as a reference. Moreover, a method of calculating the incident angle corresponding to the attitude of the antenna is not limited to the above description. The processing unit 104 is capable of calculating the incident angle corresponding to the attitude of the antenna by, in one example, any method capable of incorporating the attitude of the antenna on the incident angle of the carrier wave.

The processing unit 104, when calculating the incident angle corresponding to the attitude of the antenna, corrects the characteristics of the antenna using the correction value corresponding to the calculated incident angle.

More specifically, the processing unit 104 corrects the characteristics of the antenna, in one example, by performing one of the correction processing described in items (A) to (C) below.

(A) First Example of Correction Processing: PCV Correction

The processing unit 104 corrects the PCV as characteristics of the antenna.

The processing unit 104 specifies, on the basis of the incident angle corresponding to the attitude of the antenna that is calculated as described above, the correction value of the PCV corresponding to the relevant incident angle. Then, the processing unit 104 corrects the PCV using the specified correction value of the PCV corresponding to the incident angle corresponding to the attitude of the antenna.

Figure 10:
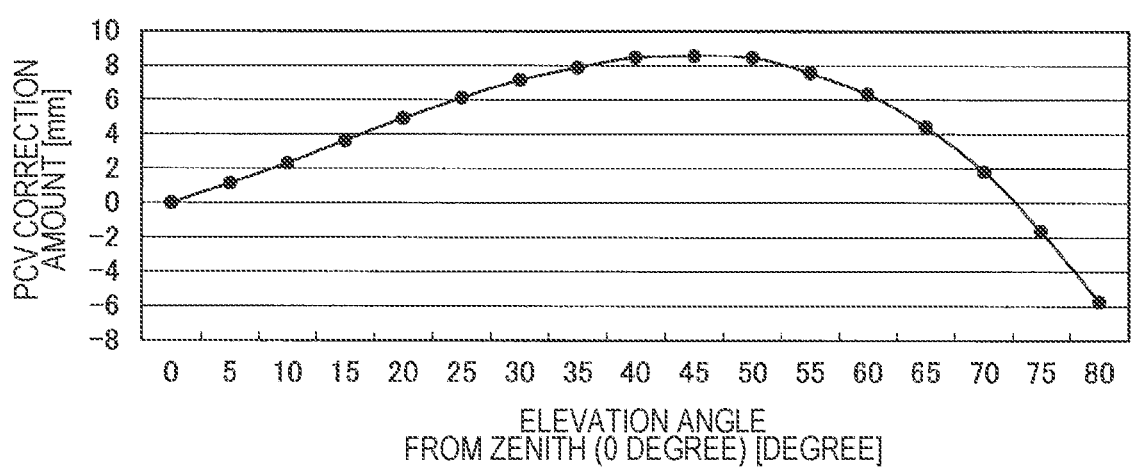
FIG. 10 is a diagram illustrated to describe the correction processing relating to the information processing method according to the present embodiment.

FIGS. 9 and 10 are diagrams illustrated to describe the correction processing relating to the information processing method according to the present embodiment. FIG. 9 illustrates an example of a correction table. In addition, FIG. 10 illustrates an example of the correction value of PCV (PCV correction amounts are shown in FIG. 10) recorded in the correction table. Examples of the correction value of the PCV as illustrated in FIG. 10 include correction values based on the National Geodetic Survey (NGS) standard or the Japan Surveying Instruments Manufacturers' Association (JSIMA) standard.

The processing unit 104 refers to, in one example, the correction table illustrated in FIG. 9, and specifies the correction value of the PCV corresponding to the incident angle corresponding to the attitude of the antenna. Then, the processing unit 104 corrects the PCV depending on the specified correction value of the PCV. In one example, the processing unit 104 corrects the PCV by adding the correction value of the PCV to the signal of the carrier wave received by the antenna.

Figure 11:
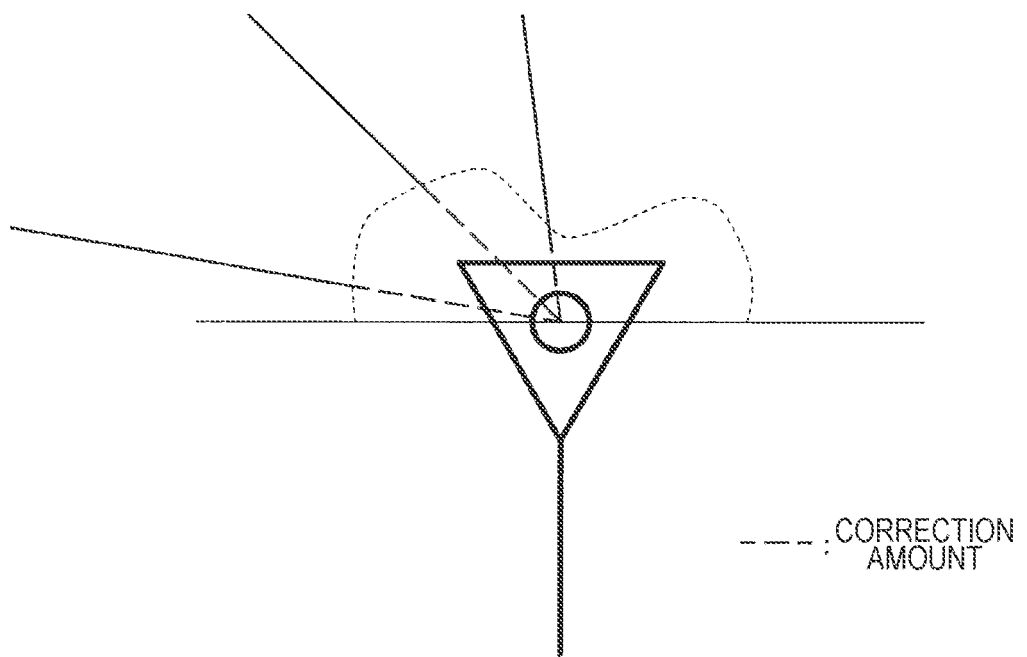
FIG. 11 is a diagram illustrated to describe the correction processing relating to the information processing method according to the present embodiment.

FIG. 11 is a diagram illustrated to describe the correction processing relating to the information processing method according to the present embodiment and illustrates an overview of the PCV correction.

The PCV correction by the correction value of PCV corresponding to the incident angle corresponding to the attitude of the antenna allows the delay amount at the time of reception of the carrier wave by the antenna to be corrected. In other words, the PCV correction allows the distance between the satellite and the antenna to be corrected as the correction amount shown in FIG. 11.

(B) Second Example of Correction Processing: PCO Correction

The processing unit 104 corrects the PCO (antenna offset) as characteristics of the antenna.

The processing unit 104 specifies, on the basis of the incident angle corresponding to the attitude of the antenna calculated as described above, the correction value of the PCO corresponding to the relevant incident angle. Then, the processing unit 104 corrects the PCO according to the specified correction value of PCO corresponding to the incident angle corresponding to the attitude of the antenna.

The processing unit 104 refers to the correction table and specifies the correction value of the PCO corresponding to the incident angle corresponding to the attitude of the antenna, which is similar to the processing according to the first example described in the item (A) above. Then, the processing unit 104 corrects the PCO depending on the specified correction value of PCO.

The PCO correction using the correction value of PCO corresponding to the incident angle corresponding to the attitude of the antenna allows the delay amount at the time of reception of the carrier wave by the antenna to be corrected.

(C) Third Example of Correction Processing: PCV Correction and PCO Correction

The processing unit 104 is capable of correcting both PCV and PCO by performing both the processing according to the first example described in the item (A) above and the processing according to the second example shown in the item (B) above.

Here, in the correction processing according to the third example, in one example, on the basis of the incident angle corresponding to the attitude of the antenna that is calculated in one processing of the processing according to the first example described in the item (A) above and the processing according to the second example described in the item (B) above, the other processing is performed. Moreover, in the correction processing according to the third example, needless to say, the processing unit 104 is capable of separately performing the processing according to the first example described in the item (A) above and the processing according to the second example shown in the item (B) above.

The information processing apparatus 100, which includes the configuration illustrated in FIG. 3, performs the processing relating to the information processing method according to the present embodiment (e.g., the "positioning processing described in the item (1) above", or the positioning processing mentioned above and correction processing described in the item (2) above").

Moreover, the configuration of the information processing apparatus according to the present embodiment is not limited to the configuration illustrated in FIG. 3.

In one example, the information processing apparatus according to the present embodiment, in a case where it is connected to an external receiving device having the configuration similar to some or all of the components of the receiving unit 102, does not necessarily include some of all of the receiving unit 102. An example of the configuration of the information processing apparatus according to the present embodiment in the case of not including some components of the receiving unit 102 includes "configuration in which one or both of the antennas 110A and 110B illustrated in FIG. 3 is an external antenna".

Further, in one example, in a case of processing the first phase information acquired from an external device having a plurality of antennas (or to which a plurality of antennas are connected), the information processing apparatus according to the present embodiment does not necessarily include the receiving unit 102. An example of the case of processing the first phase information acquired from the external device includes a case where the information processing apparatus according to the present embodiment performs the positioning of the first position of a positioning target device having a plurality of antennas (or to which a plurality of antennas is connected), a case where the information processing apparatus according to the present embodiment is applied to a processing system described later, or the like.

The information processing apparatus according to the present embodiment is capable of performing the positioning of the first position on the basis of the first phase information of the carrier waves respectively received by the plurality of antennas even in the case of not including the receiving unit 102, which is similar to the information processing apparatus 100 illustrated in FIG. 3.

Further, although the example in which the positioning of the first position is performed using two antennas in the information processing apparatus 100 illustrated in FIGS. 2 and 3 is described, the information processing apparatus according to the present embodiment is also capable of performing the positioning of the first position using three or more antennas as described above. In the case of performing the positioning of the first position using three or more antennas, the information processing apparatus according to the present embodiment performs the positioning of the first position, which is similar to the information processing apparatus 100, on the basis of the first phase information of the carrier waves respectively received by three or more antennas. Some or all of the three or more antennas may be antennas included in the information processing apparatus according to the present embodiment or an external antenna of the information processing apparatus according to the present embodiment.

Further, in the information processing apparatus 100 illustrated in FIG. 3, the processing unit 104 performs the processing relating to the information processing method according to the present embodiment as an example. However, the information processing apparatus according to the present embodiment is capable of including a configuration depending on methods of dividing the processing relating to the information processing method according to the present embodiment. As one example, the information processing apparatus according to the present embodiment may include "a positioning processing unit that performs the positioning processing described in the item (1) above and a correction unit that performs the correction processing described in the item (2) above".

Moreover, the processing relating to the information processing method according to the present embodiment is divided into "the positioning processing described in the item (1) above" and "the positioning processing and the correction processing described in the item (2) above" for the sake of convenience. Thus, in the processing relating to the information processing method according to the present embodiment, in one example, "the positioning processing and the correction processing" can be regarded as one processing. Further, the processing relating to the information processing method according to the present embodiment can be also regarded as two or more processing (depending on any method of dividing) of "the positioning processing" and "the positioning processing and the correction processing".

[II] Example of Effect Achieved by Using Information Processing Method According to Present Embodiment The information processing apparatus 100 can achieve, in one example, the effect described below. Moreover, needless to say, the effect achieved by using the information processing method according to the present embodiment is not limited to the effect described below.

(II-1) Example of Effect Achieved by Performing Positioning Processing

Carrier positioning using a plurality of antennas becomes possible.

Carrier positioning enabled by using a plurality of antennas allows carrier positioning using a small and inexpensive antenna to be implemented as compared with use of existing carrier-positioning scheme using large antenna with excellent characteristics.

Application of the information processing method according to the present embodiment to consumer equipment becomes easy by implementing carrier positioning using a small and inexpensive antenna.

Carrier positioning at any one virtual point such as the center of the head can be performed by allowing for carrier positioning using a plurality of antennas.

Use of a plurality of antennas makes it possible for influence or the like of human body to be reduced and the possibility to capture GNSS satellite to be increased.

Increase in the possibility to capture GNSS satellite lengthens capture duration of GNSS satellite, which decreases the frequency of occurrence of intermittent capture, so the time for which the positioning calculation is incapable of being performed until the determination of ambiguity is reduced.

Increase in the possibility to capture GNSS satellite makes it possible to use carrier wave signals transmitted from more GNSS satellites for positioning operation, so the positioning (position, azimuth, and speed) accuracy is improved, and the time taken to initial positioning or re-positioning is shortened, thereby improving the positioning rate.

(II-2) Example of Effect Achieved by Performing Correction Processing

In the device whose attitude is changeable such as wearable devices or mobile devices, it is possible to perform accurate PCV correction of antenna with respect to carrier waves (radio waves) transmitted from GNSS satellite.

In the device whose attitude is changeable as described above, PCO correction is possible similarly to PCV correction.

Time To First Fix (TTFF; time taken for initial positioning) or Fix rate is improved by one or both of PCV correction PCO correction, and as a result, it is expected that the positioning accuracy is improved.

Need to prepare an antenna having originally satisfactory antenna characteristics is eliminated and it is possible to accurately correct the antenna characteristics regardless of the attitude of the antenna, so it is possible to improve the accuracy of positioning by the carrier-positioning scheme using, e.g., a small and inexpensive antenna optimum for mobile equipment.

[III] Application Example of Information Processing Apparatus According to Present Embodiment Although the information processing apparatus is described above as an example of the present embodiment, the present embodiment is not limited to such a mode. The present embodiment is applicable to various devices capable of performing the processing relating to the information processing method according to the present embodiment, such as "any wearable device worn on the human body such as eyeglasses type devices, head mounted displays, clock type devices, bracelet type devices, or the like", "a communication device such as smartphones or mobile phones", "a mobile object such as automobiles or motorcycles", "a computer such as personal computers (PCs) or servers", "a tablet type device", "a game console", or the like. In addition, the present embodiment is also applicable to, in one example, a processing integrated circuit (IC) capable of being incorporated in the devices or systems as described above.

Further, the information processing apparatus according to the present embodiment may be applied to a processing system on the premise of connection to a network (or communication between devices) such as cloud computing or the like. An example of the processing system in which the processing relating to the information processing method according to the present embodiment is performed includes a "system in which a part of the processing relating to the information processing method according to the present embodiment is performed by one device including the processing system and processing other than the part of the processing relating to the information processing method according to the present embodiment is performed by another device including the processing system". In the processing system described above, in one example, the first phase information is acquired from a positioning target device having a plurality of antennas, and the positioning is performed on the first position in the positioning target device on the basis of the acquired first phase information. The first position in the positioning target device may be acquired together with the first phase information or may be a preset position.

(Program According to Present Embodiment)

It is possible to improve accuracy of the positioning using a plurality of antennas by executing a program (e.g., a program capable of executing the processing relating to the information processing method according to the present embodiment, such as "the positioning processing described in the item (1) above", the positioning processing and the correction processing described in the item (2) above) for causing a computer system to function as the information processing apparatus according to the present embodiment.

The execution of the program for causing the computer system to function as the information processing apparatus according to the present embodiment by the processor or the like in the computer system makes it possible to achieve the effects by the processing relating to the information processing method according to the present embodiment described above.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In one example, although the above description is given of the case where the program (computer program) for causing the computer system to function as the information processing apparatus according to the present embodiment is provided, the present embodiment is also capable of further providing a recording medium having the program stored therein.

The configuration described above is an example of the present embodiment, and naturally belongs to the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a receiving unit including a plurality of antennas capable of receiving a carrier wave transmitted from a satellite; and a processing unit configured to perform positioning of a set first position on the basis of first phase information of carrier waves respectively received by a plurality of the antennas.

(2)

The information processing apparatus according to (1), in which the processing unit corrects each piece of the first phase information corresponding respectively to a plurality of the antennas as if the carrier wave is received at the first position, and performs positioning of the first position on the basis of a plurality of pieces of second phase information in which respective pieces of the first phase information are corrected.

(3)

The information processing apparatus according to (2), in which, in a case of correcting the first phase information of a carrier wave received by one antenna among a plurality of the antennas, the processing unit corrects the first phase information on the basis of a first distance between the first position and a second position corresponding to the one antenna and a positional relationship between the first position, the second position, and the satellite that has transmitted the received carrier wave.

(4)

The information processing apparatus according to (3), in which the processing unit obtains a path difference that is a difference between a second distance between the satellite that has transmitted the received carrier wave and the first position, and a third distance between the satellite that has transmitted the received carrier wave and the second position, on the basis of the first distance and the positional relationship, and corrects the first phase information on the basis of the obtained path difference.

(5)

The information processing apparatus according to (3) or (4), in which the processing unit estimates the positional relationship on the basis of an attitude of the information processing apparatus, a position of the information processing apparatus, and a position of the satellite that has transmitted the received carrier wave.

(6)

The information processing apparatus according to any one of (2) to (5), in which the processing unit performs positioning of the first position by performing a real-time kinematic operation using a plurality of pieces of the second phase information corresponding to carrier waves respectively transmitted from a plurality of the satellites.

(7)

The information processing apparatus according to any one of (1) to (6), in which, in a case where a plurality of pieces of the first phase information of a carrier wave transmitted from the same satellite is acquired, the processing unit performs positioning of the first position on the basis of one piece of the first phase information selected from a plurality of pieces of the acquired first phase information or third phase information generated from a plurality of pieces of the acquired first phase information.

(8)

The information processing apparatus according to (7), in which, in a case of selecting one piece of the first phase information is selected from a plurality of pieces of the first phase information, the processing unit selects one piece of the first phase information on the basis of a power ratio between a received carrier wave and noise.

(9)

The information processing apparatus according to (7), in which, in a case of generating the third phase information, the processing unit generates the third phase information by performing averaging processing on a plurality of pieces of the acquired first phase information.

(10)

The information processing apparatus according to (9), in which the processing unit performs the averaging processing by applying weight based on a power ratio between a received carrier wave and noise.

(11)

The information processing apparatus according to any one of (7) to (10), in which the processing unit performs processing of selecting one piece of the first phase information from a plurality of pieces of the first phase information or processing of generating the third phase information on the basis of a power ratio between a received carrier wave and noise.

(12)

The information processing apparatus according to any one of (1) to (11), in which the processing unit corrects a characteristic of the antenna on the basis of an attitude of the antenna.

(13)

The information processing apparatus according to (12), in which the processing unit corrects phase center variation (PCV) as the characteristic.

(14)

The information processing apparatus according to (13), in which the processing unit calculates an incident angle of the carrier wave to the antenna, the incident angle corresponding to the attitude of the antenna, and corrects the PCV by a correction value corresponding to the calculated incident angle.

(15)

The information processing apparatus according to any one of (12) to (14), in which the processing unit corrects an offset of the antenna as the characteristic.

(16)

The information processing apparatus according to (15), in which the processing unit calculates an incident angle of the carrier wave to the antenna, the incident angle corresponding to the attitude of the antenna, and corrects the offset using a correction value corresponding to the calculated incident angle.

(17)

The information processing apparatus according to any one of (1) to (16), in which the information processing apparatus is a wearable device capable of being used while being worn on a human body.

(18)

An information processing apparatus including:

a processing unit configured to perform positioning of a set first position on the basis of first phase information of carrier waves respectively received by a plurality of antennas capable of receiving a carrier wave transmitted from a satellite.

(19)

An information processing method that is executed by an information processing apparatus, the method including:

a step of performing positioning of a set first position on the basis of set first phase information of carrier waves respectively received by a plurality of antennas capable of receiving a carrier wave transmitted from a satellite.

REFERENCE SIGNS LIST

10, 100 information processing apparatus
20 base station
102 receiving unit 104 processing unit
110A, 110B antenna
112A, 112B receiving circuit
Sa, Sb satellite

The invention claimed is:
1. An information processing apparatus comprising:
a receiving unit including a plurality of antennas each capable of receiving a carrier wave transmitted from a satellite; and
a processing unit configured to:
correct each piece of first phase information of carrier waves respectively received by the plurality of antennas as if the carrier waves are received at a first position; and
perform positioning of the first position on a basis of a plurality of pieces of second phase information in which respective pieces of the first phase information of the carrier waves are corrected.
2. The information processing apparatus according to claim 1,
wherein, in a case of the correction of the first phase information of a carrier wave received by one antenna among the plurality of antennas,
the processing unit is further configured to correct the first phase information on a basis of a first distance between the first position and a second position corresponding to the one antenna and a positional relationship between the first position, the second position, and the satellite that has transmitted the received carrier wave.
3. The information processing apparatus according to claim 2,
wherein the processing unit is further configured to obtain a path difference that is a difference between a second distance between the satellite that has transmitted the received carrier wave and the first position, and a third distance between the satellite that has transmitted the received carrier wave and the second position, on a basis of the first distance and the positional relationship, and
correct the first phase information further on a basis of the obtained path difference.
4. The information processing apparatus according to claim 2,
wherein the processing unit is further configured to estimate the positional relationship on a basis of an attitude of the information processing apparatus, a position of the information processing apparatus, and a position of the satellite that has transmitted the received carrier wave.
5. The information processing apparatus according to claim 1,
wherein the processing unit is further configured to perform positioning of the first position by execution of a real-time kinematic operation using the plurality of pieces of the second phase information corresponding to the carrier waves respectively received by the plurality of antennas.
6. The information processing apparatus according to claim 1,
wherein, in a case where a plurality of pieces of the first phase information of the carrier wave transmitted from the same satellite is acquired,
the processing unit is further configured to perform positioning of the first position on a basis of one piece of the first phase information selected from the plurality of pieces of the acquired first phase information or third phase information generated from the plurality of pieces of the acquired first phase information.
7. The information processing apparatus according to claim 6,
wherein, in a case of the selection of the one piece of the first phase information from the plurality of pieces of the acquired first phase information,
the processing unit is further configured to select the one piece of the first phase information on a basis of a power ratio between a received carrier wave and noise.
8. The information processing apparatus according to claim 6,
wherein, in a case of the generation of the third phase information,
the processing unit is further configured to generate the third phase information by execution of averaging processing on the plurality of pieces of the acquired first phase information.
9. The information processing apparatus according to claim 8,
wherein the processing unit is further configured to perform the averaging processing by application of weight based on a power ratio between a received carrier wave and noise.
10. The information processing apparatus according to claim 6,
wherein the processing unit is further configured to perform processing to select the one piece of the first phase information from the plurality of pieces of the acquired first phase information or processing to generate the third phase information on a basis of a power ratio between a received carrier wave and noise.
11. The information processing apparatus according to claim 1,
wherein the processing unit is further configured to correct a characteristic of an antenna of the plurality of the antennas on a basis of an attitude of the antenna.
12. The information processing apparatus according to claim 11,
wherein the processing unit is further configured to correct phase center variation (PCV) as the characteristic.
13. The information processing apparatus according to claim 12,
wherein the processing unit is further configured to calculate an incident angle of the carrier wave to the antenna and the incident angle corresponding to the attitude of the antenna, and
correct the PCV by a correction value corresponding to the calculated incident angle.
14. The information processing apparatus according to claim 11,
wherein the processing unit is further configured to correct an offset of the antenna as the characteristic.
15. The information processing apparatus according to claim 14,
wherein the processing unit is further configured to calculate an incident angle of the carrier wave to the antenna and the incident angle corresponding to the attitude of the antenna, and
correct the offset using a correction value corresponding to the calculated incident angle.
16. The information processing apparatus according to claim 1,
wherein the information processing apparatus is a wearable device capable of being used while being worn on a human body.

17. An information processing apparatus comprising:
a processing unit configured to:
- correct each piece of first phase information of carrier waves respectively received by a plurality of antennas as if the carrier waves are received at a first position, wherein the plurality of antennas is capable to receive a carrier wave transmitted from a satellite; and
- perform positioning of the first position on a basis of a plurality of pieces of second phase information in which respective pieces of the first phase information of the carrier waves are corrected.

18. An information processing method that is executed by an information processing apparatus, the method comprising:
- correcting each piece of first phase information of carrier waves respectively received by a plurality of antennas as if the carrier waves are received at a first position, wherein the plurality of antennas is capable to receive a carrier wave transmitted from a satellite; and
- performing positioning of the first position on a basis of a plurality of pieces of second phase information in which respective pieces of the first phase information of the carrier waves are corrected.

* * * * *